United States Patent
Lee et al.

(10) Patent No.: US 7,064,149 B2
(45) Date of Patent: Jun. 20, 2006

(54) PROCESS FOR PREPARING POLYMER LATEX RESIN POWDER

(75) Inventors: Ji-Hyun Lee, Yeosoo (KR); Byung-Tae Yang, Yeosoo (KR); Chan-Hong Lee, Daejeon (KR)

(73) Assignee: LC Chem, Ltd. (KR)

( * ) Notice: Subject to any disclaimer, the term of this patent is extended or adjusted under 35 U.S.C. 154(b) by 380 days.

(21) Appl. No.: 10/415,300

(22) PCT Filed: Sep. 3, 2002

(86) PCT No.: PCT/KR02/01667

§ 371 (c)(1),
(2), (4) Date: Apr. 28, 2003

(87) PCT Pub. No.: WO03/022891

PCT Pub. Date: Mar. 20, 2003

(65) Prior Publication Data

US 2005/0101726 A1    May 12, 2005

(30) Foreign Application Priority Data

Sep. 13, 2001 (KR) .............................. 2001-56563

(51) Int. Cl.
   C08J 3/16       (2006.01)
   B01F 3/08       (2006.01)

(52) U.S. Cl. ........................ 516/53; 523/202; 525/262; 528/486

(58) Field of Classification Search .................. 516/53
See application file for complete search history.

(56) References Cited

U.S. PATENT DOCUMENTS

| | | | |
|---|---|---|---|
| 2,568,659 A * | 9/1951 | Powell, Jr. ............... | 526/292.6 |
| 2,576,909 A | 12/1951 | Adams | |
| 2,869,977 A * | 1/1959 | Richter, Jr. et al. ......... | 264/182 |
| 3,947,537 A * | 3/1976 | Buntin et al. ............... | 264/137 |
| 4,309,525 A | 1/1982 | Nakabayashi et al. | |
| 4,499,213 A | 2/1985 | Sato | |
| 4,897,462 A | 1/1990 | Yusa et al. | |
| 4,997,911 A | 3/1991 | Yasui et al. | |
| 5,065,938 A | 11/1991 | Anderson | |
| 5,346,986 A * | 9/1994 | Schneider et al. .......... | 528/495 |
| 6,172,135 B1 * | 1/2001 | Fraser et al. ................ | 523/201 |
| 6,242,526 B1 * | 6/2001 | Siddiqui et al. ............ | 524/555 |
| 6,753,382 B1 * | 6/2004 | Kim et al. ................... | 525/316 |

FOREIGN PATENT DOCUMENTS

CA    1116537 A *    1/1982

(Continued)

OTHER PUBLICATIONS

International Search Report; PCT/KR02/01667; Dec. 18, 2002.

*Primary Examiner*—Randy Gulakowski
*Assistant Examiner*—Timothy J. Kugel
(74) *Attorney, Agent, or Firm*—Cantor Colburn LLP

(57) ABSTRACT

The present invention relates to a process for preparing polymer latex resin powder, and particularly to a process for preparing polymer latex resin powder including coagulating polymer latex and aging the polymer latex. The process further includes introducing an emulsifier into polymer latex emulsion before coagulation. The polymer latex resin powder prepared by the present invention has 85 wt % or more of particles with diameter of 70 to 400 μm, each 10 wt % or less of fine powder with less than 70 μm and those with 400 μm or more, and it has superior bulk density and caking property.

6 Claims, 1 Drawing Sheet

FOREIGN PATENT DOCUMENTS

| | | |
|---|---|---|
| DE | 139264 | 12/1979 |
| DE | 4103969 | 8/1992 |
| FR | 502909 | 6/1976 |
| GB | 21 57297 | 10/1984 |
| JP | 53 137873 | 12/1978 |
| JP | 56 41227 | 4/1981 |
| JP | 57 59929 | 4/1982 |
| JP | 60 026006 | 2/1985 |
| JP | 58 87102 | 9/1985 |
| JP | 61 42923 | 3/1986 |
| JP | 63 135404 | 6/1988 |
| JP | 01 104601 | 4/1989 |
| JP | 01104601 A * | 4/1989 |
| JP | 53 33244 | 12/1993 |
| SU | 502909 A * | 6/1976 |

* cited by examiner

PROCESS FOR PREPARING POLYMER LATEX RESIN POWDER

BACKGROUND OF THE INVENTION

1. Field of the Invention

The present invention relates to a process for preparing polymer latex resin powder, and particularly to a process for preparing polymer latex resin powder comprising the steps of coagulating polymer latex and aging it, wherein the process comprises a step of introducing an emulsifier into polymer latex emulsion before coagulation.

2. Description of the Related Art

In general, an emulsion polymerization process for continuously preparing polymer resin in latex into powder includes a coagulation process and an aging process. The coagulation process is occurred by introducing an aqueous solution of coagulant such as inorganic salt or acid, etc. into polymer latex. As a result, the electrostatic stabilization by emulsifier is broken and polymer particles in latex conglomerate by neutralization of electric charge, which is referred to as floc. However, since such floc cannot form a physical bond but form a kind of multi-particle assemblage, break-up may easily occur by agitating flow due to external impeller, etc. Therefore, in order to increase strength of floc, the aging process follows the coagulation process. The aging process is conducted at high temperature and floc forms one particle having some strength by mutual penetration between chains.

However, since such process uses an excessive amount of coagulant and thus coagulation process is very rapid to make it significantly irregular, final particles have irregular shape and significantly broad particle size distribution, which causes many problems in process. Practically, if large particles with a diameter of 400 μm or more are largely produced, problems in transfer and storage occur. And, if fine powders with a diameter of 70 μm or less are largely produced, dehydration and drying capacities drop, problems are raised in loss of resin due to scattering of fine powders and transfer of powder during process, and dust is produced to cause environmental pollution and aggravation of work conditions.

In order to improve these problems, U.S. Pat. No. 4,897,462 and British Patent No. 2,157,97A have described slow coagulation at critical coagulation concentration or less, but the method cannot overcome high viscose area generally produced in the slow coagulation and thus it is applied only for batch-coagulation process. And, moisture contents of powder are high due to slow coagulation and thus dehydration effects are inferior, and powder of which structure is not fine may be produced because of irregular mutual melting of fine solid particles due to high temperature during aging process, and consequently, bulk density of powder may be lowered.

In addition, Japanese Laid-open Publication Sho 53-33244, Sho 53-137873, Sho 56-41227, Sho 57-59929, Sho 58-87102, and Sho 61-42923, etc. have described a method for recovering powder by dispersing droplets of a polymer latex in a coagulating atmosphere by gas-phase spray system.

Although this method showed superior results in terms of particle size distribution, particle is attached to the wall surface of coagulation tank, and, due to a large amount of recovery solution for preventing such particle attachment, solid contents control inside a coagulation tank is limited and waste water is produced. And, for commercial application, coagulation tank equipment occupies very large area and space and thus energy consumption for satisfying coagulation condition of high temperature of 60° C. or more increases much, and coagulant should be introduced in large amount and thus remaining coagulant may have a bad influence on final quality of polymer resin.

In addition, U.S. Pat. Nos. 4,997,911 and 5,065,938 have described a method for controlling size of powder in the presence of an organic solvent and a method for improving bulk density, but used amount of an organic solvent is very large, which is a burden on realization of process equipment.

SUMMARY OF THE INVENTION

The present invention is made in consideration of the problems of the prior art. The present invention provides a process for preparing polymer latex resin powder comprising coagulating and aging polymer latex, and then drying and dehydrating it to recover powder, wherein the polymer latex resin powder is prepared through a multi-stage continuous coagulation process.

The present invention further provides a process for preparing polymer latex resin powder having narrow particle size distribution and improved properties including bulk density and caking.

The present invention still further provides a process for preparing polymer latex resin powder having 85 wt % or more of polymer particles with size of 70 to 400 μm.

The present invention still provides a process for preparing polymer latex resin powder comprising the steps of coagulating polymer latex and aging it, wherein an emulsifier into a polymer latex emulsion is introduced before coagulation.

Figure 1:
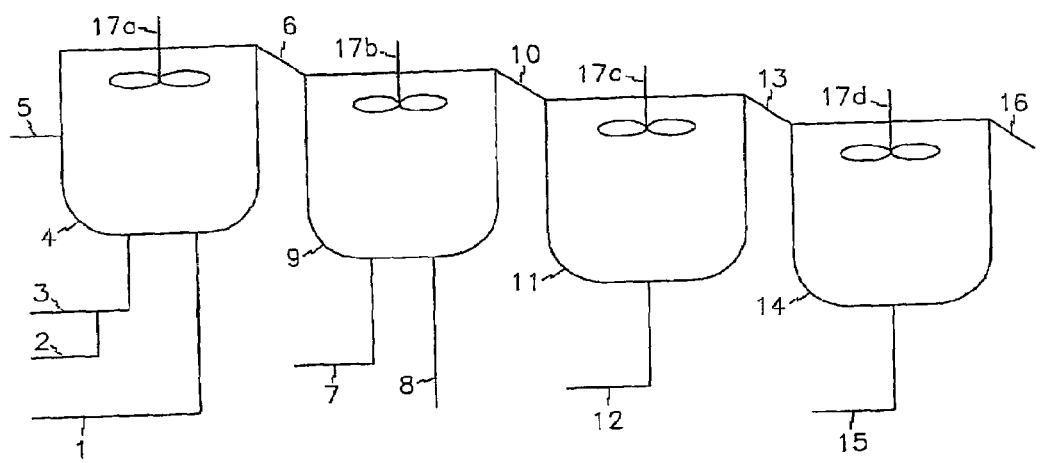
FIG. 1 is a schematic view of multi-stage continuous coagulation process for recovering powder from polymer latex according to the present invention.

EXPLANATION OF REFERENCE NUMERALS IN FIGS.

1: Polymer latex supply line
2: Primary coagulant supply line
3: water supply line
4: Primary coagulation tank
5: Steam supply line
6 Primary coagulation tank overflow line
7: Steam supply line
8: Secondary coagulant supply line
9: Secondary coagulation tank
10: Secondary coagulation tank overflow line
11: Primary aging tank
12 Steam supply line
13: Primary aging tank overflow line
14: Secondary aging tank
15: Steam supply line
16: Secondary aging tank overflow line
17a, 17b, 17c, 17d: Agitator

DETAILED DESCRIPTION AND THE PREFERRED EMBODIMENTS

The present invention will now be explained in detail.

The present invention relates to a process for preparing polymer latex resin powder by coagulating polymer latex at around critical coagulation concentration to form particles and aging it to obtain powder, contrary to the existing rapid coagulation using excessive amount of coagulant.

More particularly, the present invention relates to a process for preparing polymer latex resin powder comprising:
a) introducing an emulsifier into a storage tank containing polymer latex emulsion to form a polymer latex;
b) continuously supplying the polymer latex, a primary coagulant, and water into a primary coagulation tank to form a mixture;
c) primary coagulating the mixture in the primary coagulation tank by allowing the mixture to remain for 2 to 5 minutes to form a primary coagulated slurry wherein the temperature of the primary coagulation tank is 30 to 40° C. lower than or equal to the glass transition temperature of the polymer latex, and transferring the prepared primary coagulated slurry to a secondary coagulation tank;
d) secondary coagulating the primary coagulated slurry in the secondary coagulation tank by allowing the primary coagulated slurry to remain for 10 to 25 minutes to prepare a secondary coagulated slurry wherein a temperature of the secondary coagulation tank is 1 to 10° C. greater than or equal to the temperature of the primary coagulation tank, and transferring the prepared secondary coagulated slurry to a primary aging tank;
e) primary aging the secondary coagulated slurry in the primary aging tank by allowing the secondary coagulated slurry to remain for 60 to 90 minutes to prepare a primary aged slurry wherein a temperature of the primary aging tank is 5 to 20° C. greater than or equal to the temperature of the secondary coagulation tank, and transferring the prepared primary aged slurry to a secondary aging tank; and
f) secondary aging the primary aged slurry in the secondary aging tank by allowing the primary aged slurry to remain for 60 to 90 minutes wherein a temperature of the secondary aging tank is 10 to 20° C. greater than or equal to the temperature of the primary aging tank.

According to the present invention, in a method for recovering polymer latex resin as a powder having 85 wt % of more of particles with size of 70 to 400 μm by adding polymer latex with size of approximately 0.05 to 0.4 μm and coagulant such as inorganic salt or acid, etc., small amount of emulsifier is introduced into polymer latex emulsion to improve stability of latex, slow coagulation is induced by small amount of coagulant for a short residence time in a primary coagulation tank to form a cream phase coagulated body having viscosity at which agitation is possible, large amount of coagulant is added to a secondary coagulation tank to induce complete coagulation for a long residence time compared to that of the primary coagulation tank, and then the slurry passing through the primary and secondary coagulation tanks is transferred to a primary aging tank and then a secondary aging tank, and the hardness of the coagulated particles are strengthened in the primary and secondary aging tanks.

As the polymer latex used in the present invention, those prepared by emulsion polymerization can be used.

Examples of the polymer latex include:

First, polymer latex (A) prepared by adding 20 to 80 weight parts of monomer mixture of 0 to 50 weight parts of acrylonitrile monomers, 0 to 100 weight parts of methacrylate or acrylate ester monomers, 0 to 90 weight parts of vinyl aromatic monomers and 0 to 10 weight parts of cross-linking agent or grafting agent capable of copolymerizing therewith to 20 to 80 weight parts of acrylic rubber latex prepared by emulsion polymerization of 80 to 99 weight parts of one or more kinds selected from acrylate or methacrylate ester monomers having carbon number of 1 or 2 or more and 0.5 to 10 weight parts of cross-linking agent capable of crosslinking-polymerizing, to graft polymerize them; or Second, polymer latex (B) prepared by continuously adding 20 to 60 weight parts of vinylaromatic compound single or complex monomers, 5 to 20 weight parts of vinyl cyanide compounds, and 0 to 5 weight parts of one or more kinds of single or complex monomers of alkylacrylate and glycidylacrylate having C1–2 alkyl group to 20 to 60 weight parts of butadiene rubber latex prepared by emulsion polymerization of 30 to 50 weight parts of styrene, 50 to 70 weight parts of butadiene and 0 to 3 weight parts of cross-linking agent capable of cross-linking therewith, to graft polymerize them.

In the step of a), the emulsifier is preferably added in an amount of 0.3 to 0.5 weight parts per 100 weight parts of polymer, and sodium lauryl sulfate, sodium diocrylsulfosucciflate, etc. can be used.

As the coagulant, water-soluble inorganic acid or inorganic salt is used for the primary and secondary coagulants. For examples, chloric acid, sulfuric acid, phosphoric acid and sulfate, calcium salt, etc. can be used, and the amount of the primary coagulant is limited by critical coagulation concentration according to the properties of latex, and the secondary coagulant is preferably used in an amount of 2 to 3 weight parts per 100 weight parts of total polymer.

In each step of the present invention, material is transferred to the next step by overflow method.

In rapid coagulation using excessive amount of coagulant, energy barrier does not exist and thus coagulation is very rapid to make the process significantly irregular, therefore final particles have irregular shape, while in slow coagulation, coagulation occurs in secondary well area where an energy barrier exists and thus coagulation is slow and there is a room for particles to be rearranged, thus enabling preparation of spherical particles by regular charge.

In order to find a secondary well area where slow coagulation is induced, theoretically, a method by total potential energy change graph through measurement of zeta-potential can be used, but exact value is difficult to find by this method because an error in measurement is large compared to secondary well of narrow area. Therefore, in the present invention slow coagulation is judged on the basis of the fact that at a critical coagulation concentration, specifically at a point when slow coagulation is induced when observing change in particle shape while increasing the amount of cohesive agent by small quantity with agitating under the same temperature conditions, particle shape becomes spherical and size distribution becomes very narrow, and that if exceeding this concentration, amorphous particles are produced and particle size distribution becomes wide.

The process of the present invention based on the slow coagulation is comprised of 5 steps, and coagulation and aging are conducted respectively in 2-steps. The process of the present invention will be explained in detail.

Introduction of an Emulsifier into Polymer Latex Emulsion

Most of polymerized latex is stored in a storage tank and then transferred to the next step according to production plan of post processing including coagulation. In order to smoothly induce slow coagulation in subsequent process, small amount of emulsifier is introduced in a latex storage tank. The introduction of emulsifier gives chemical stability in latex and thus exerts effects for decreasing coagulation speed in subsequent coagulation process. Preferably, the emulsifier is introduced in a storage tank before coagulation is done. And, when it is introduced in a primary and secondary coagulation tanks where coagulation is under progress, although bulk density of powder and powder properties are improved compared to when the emulsifier is not introduced, stabilization and coagulation of latex simultaneously occur and thus the effects are inferior.

Primary Coagulation Tank

This step is to add polymer latex having size of approximately 0.05 to 0.4 μm and coagulant such as inorganic salt or acid, etc. to induce slow coagulation by small amount of coagulant for a short residence time, thereby forming cream phase coagulated body with viscosity at which agitation is possible.

In the primary coagulation tank, distinction of critical coagulation concentration is very important, which is a point when shape of particles becomes spherical and particle size distribution becomes very narrow. As the contents of coagulant becomes smaller than critical coagulation concentration, shape of particles becomes amorphous, and if the contents of coagulant exceed critical coagulation concentration, shape of particles are irregular and fine particles with size of 70 μm or less are largely produced. Therefore, in slow coagulation, distinction of the critical coagulation concentration is very important.

Slow coagulation is largely influenced by coagulation temperature and total solid contents in addition to critical coagulation concentration. If the coagulation temperature is higher than standard temperature, sphericahty and shape of particles at critical coagulation concentration are satisfactory but particle diameter of total particle becomes large in proportion to coagulation temperature, and if it is lower than standard temperature, particle diameter becomes small and sphericality and shape of particles are inferior. Thus, determination of critical coagulation concentration by selection of appropriate coagulation temperature and contents of coagulant is important.

And, coagulation conditions change a lot according to total solid contents. As the solid contents increase, critical coagulation concentration becomes lower for the same coagulation temperature, specifically, slow coagulation can be induced by smaller amount of coagulant than when the solid contents are low. This is because number of collisions between particles increases at coagulation as the solid contents increase. Since critical coagulation concentration is difficult to distinguish by naked-eyes, it is preferable to use optical microscope of various magnifications.

Since biding power of prepared particles is weak in the primary coagulation tank compared to the existing process using excessive amount of coagulant, particles are very likely to be broken by agitation and thus particle shape and particle size may become inferior. In order to improve these problems, comparatively short residence time and narrow residence time distribution are induced to restrain upper and lower agitation in a coagulation tank, and flow in a fluid flowing direction without speed difference is induced thereby inducing reversible coagulation instead of irreversible coagulation.

L/D (length/diameter) of the primary coagulation tank is 1.5 to 2.0, which is larger than that of general reactor in order to compensate comparatively short residence time.

In the primary coagulation tank, latex, coagulant and water are supplied to the lower part of the tank, and transferred to a secondary coagulation tank by overflow method through the upper part of the tank. As mentioned-above, since raw material is introduced into the lower part of the tank and discharged through the upper part of the tank, short pass, specifically, the phenomenon that slurry cannot sufficiently stay in a coagulation tank and discharged immediately after introduced, of slurry largely decreases compared to the existing upper part introduction/upper part discharge, thus making narrow residence time distribution.

In addition, for an agitator, number of stages is preferably set as 3 considering L/D of 1.5 to 2, and it is preferable to use 4-blade-flat paddle inducing radial flow under no baffle conditions in order to prevent upper and lower agitation in a coagulation tank. And, the ratio (d/D) of diameter (d) of agitator and diameter of coagulation tank (D) is preferably 0.6 to 0.7, and this is because viscosity of slurry in a coagulation tank is high compared to the existing tank and thus at general d/D level of 0.3 to 0.4, smooth agitation is difficult. And, linear velocity of agitator is preferably 1.5 to 3.0 m/sec.

Referring to temperature conditions of a primary tank, the temperature of the primary tank is preferably 30 to 40° C. lower than glass transition temperature (Tg), and since in the primary coagulation tank, particle size is sensitive to temperature, it is preferable to control process temperature by jacket-type tank. In addition, residence time in a tank is preferably 2 to 5 minutes considering particle shape and particle size, and more preferably 2 to 3 minutes considering operation efficiency. If the residence time exceeds 5 minutes, residence time distribution in the coagulation tank broadens and thus particle size distribution becomes inferior.

The kinds of the used aqueous solution of primary coagulant change according to the kinds of polymer latex. And, according to the kinds of coagulant, coagulating power differs and thus used amount thereof largely changes, and preferably, it is used an amount of 0.5 to 2.5 weight parts per 100 weight parts of polymer. And, in order to maintain uniform mixed concentration inside a coagulation tank, it should be diluted with water and used, and the diluted concentration is preferably 5 to 10%.

When the polymer latex A is coagulated, appropriate coagulation temperature is about 36 to 37° C., calcium salt is used as a coagulant, and critical coagulation concentration is, on the basis of total solid contents of 10%, 2.2 to 2.5 weight parts per polymer. And, when the polymer latex B is coagulated, since rubber contents are lower and glass transition temperature (Tg) is higher than A, it is preferable to operate at high temperature, appropriate coagulation temperature is about 65 to 70° C., on the basis of total solid contents of 15%, sulfuric acid is used as a coagulant, and critical coagulation concentration is 0.6 to 0.7 weight parts per polymer.

Secondary Coagulation Tank

This step is to introduce excessive amount of coagulant in slurry particles of cream phase passed primary coagulation tank to make completely coagulated particles. Secondary coagulated slurry made into complete coagulated particles in the secondary coagulation tank is transferred to primary aging tank by overflow method.

In addition, the secondary coagulation tank functions as buffering area between the primary coagulation tank and primary aging tank. Specifically, for polymer latex with rubber contents of 70% or more, if latex or non-coagulated substance is directly left at high temperature, conglomeration of particles is produced by shock due to heat, but the secondary coagulation tank, intermediate step between the primary coagulation tank and primary aging tank, prevents conglomeration of particles according to rapid temperature elevation.

Temperature conditions of the secondary coagulation tank differ according to properties of latex. Generally, temperature of the tank is 3 to 10° C. greater than the temperature of the primary coagulation, and since particles size does not significantly change by temperature, it is preferable to control process temperature by direct steam-spray method considering thermal efficiency. And, residence time in the secondary coagulation tank is preferably 10 to 25 minutes.

The amount of coagulant introduced into the secondary coagulation tank is larger than those Introduced in the primary coagulation tank, which is generally 2 to 3 weight parts on the basis of polymer contents. The introduced amount is based on the polymer of which mother liquor separation completely occurred and shape of particle made in the primary coagulation tank did not change. Since particles are not sensitive to agitating power of an agitator compared to in the primary coagulation tank, pitched paddle or flat paddle can be used for an agitator.

For the polymer latex A which has high rubber contents and thus is sensitive to heat, operation is conducted at 4 to 5° C. above the temperature of the primary coagulation tank (40 to 45° C.), and for the polymer latex B which has rubber contents of approximately 50% and is not sensitive to temperature, operation is conducted at approximately 10° C. above the temperature of the primary coagulation tank (75 to 80° C.).

Primary Aging Tank

This step is to strengthen the hardness of coagulated particles passed through primary and secondary coagulation tanks. Operation is conducted at a temperature of 5 to 20° C. greater than the secondary coagulation tank for 60 to 90 minutes to cause mutual penetration between polymer chains thereby forming one solid particle.

Since particle shape of slurry transferred from coagulation tank does not change but is only hardened in an aging tank, structure of the aging tank or kinds of an agitator does not have significant influence. However, in order to induce smooth flow in the aging tank, pitched paddle type equipped with battle is preferable.

The primary aging tank finds appropriate conditions of shape and size of particles made in the coagulation tank and continuously maintains them in subsequent step.

For the polymer latex A, temperature conditions of the primary aging tank is 60 to 65° C., and if more than 65° C., particles are conglomerated, and if less than 60° C., particles will be conglomerated in a secondary aging tank. And, for the polymer latex B, temperature conditions of the primary aging tank is preferably 80 to 85° C.

Secondary Aging Tank

This step is to strengthen hardness of coagulated particle similarly to the primary aging tank, and operation is preferably conducted at a temperature of 10 to 20° C. greater than a temperature of the primary aging tank for 60 to 90 minutes.

For the polymer latex A, temperature conditions of secondary aging tank is 85 to 90° C., and if more than 90° C., particles are enlarged by shock due to high temperature, and if less than 85° C., aging is not completed and thus hardness of particle decreases to cause problems in dehydration process. In addition, for the polymer latex B, temperature conditions of secondary aging tank is preferably 93 to 98° C.

As explained, polymer latex resin powder prepared through each 2-step of coagulation tanks and aging baths has 85 wt % or more of particles having diameter of 70 to 400 μm, unlikely to the existing commercial polymer resin having broad particle size distribution over the range of 74 to 841 μm. And, it has each 10 wt % or less of fine powder of less than 70 μm and coarse powder of more than 400 μm, and it has superior bulk density and caking property.

The present invention will be explained in more detail with reference to the following Examples. However, these are to illustrate the present invention and the present invention is not limited to them.

EXAMPLE

Example 1

According to the production line of FIG. 1, on the basis of 100 weight parts of polymer, 0.3 weight parts of sodium lauryl sulfate emulsifier was added to polymer latex emulsion having solid contents of 40% to prepare polymer latex (A). The polymer latex (A) was supplied to the lower part of primary coagulation tank at a flow of 132 L/hr simultaneously with 11.7 L/hr (2.2 weight parts on the basis of polymer resin) of calcium salt coagulant diluted to 10% and 263 L/hr of water, and residence time in the primary coagulation tank and process temperature were respectively controlled to 2 minutes 30 seconds and 37° C. to induce coagulation of the polymer latex (A), and then, the coagulated polymer latex was transferred to a secondary coagulation tank by overflow method. 15.9 L/hr of calcium salt was added to the secondary coagulation tank as a secondary coagulant, and residence time was controlled to 10 minutes and amount of steam was controlled so that process temperature may be 42° C. Then, coagulated slurry was transferred to the upper part of aging tank, and it was made to stay in primary/secondary tanks respectively at 60° C./90° C. for each 30 minutes to sufficiently age. Aged polymer latex resin powder was transferred to a storage tank. Particle size distribution and physical properties of polymer latex resin powder obtained by the above process are shown in Table 1.

Example 2

On the basis of 100 weight parts of polymer, 0.3 weight parts of sodium dioctylsulfosuccinate emulsifier was added to polymer latex emulsion of solid contents 42% to prepare polymer latex (B). The polymer latex (B) was supplied to the lower part of primary coagulation tank at a flow rate of 121 L/hr simultaneously with 7.1 L/hr of sulfuric acid coagulant diluted to 5% and 211 L/hr of water, and residence time in the primary coagulation tank and process temperature were respectively controlled to 3 minutes and 60° C. to induce coagulation, and then the coagulated polymer latex was transferred to a secondary coagulation tank by overflow method. 30.0 L/hr of sulfuric acid coagulant was added in the secondary coagulation tank, and residence time was controlled to 10 minutes and the amount of steam was controlled so that process temperature may be 70° C. Coagulated slurry was transferred to the upper part of an aging tank, and it was made to stay in primary/secondary aging tanks respectively at 80° C./93° C. for each 30 minutes to sufficiently age. The aged polymer latex resin powder was transferred to a storage tank. The particle size distribution and physical properties of the polymer latex resin powder obtained by the above process are as shown in Table 1.

Comparative Example 1

Polymer latex resin powder was obtained by the same process as in Example 1, except that on the basis of 100 weight part of polymer, 0.5 weight parts of sodium lauryl sulfate emulsifier was added to polymer latex emulsion. And, particle size distribution and physical properties of the obtained polymer latex resin powder are shown in Table 1.

Comparative Example 2

Polymer latex resin powder was obtained by the same process as in Example 1, except that no sodium lauryl sulfate emulsifier was added to polymer latex emulsion. And, particle size distribution and physical properties of the obtained polymer latex resin powder are shown in Table 1.

Comparative Example 3

Polymer latex resin powder was obtained by the same process as in Example 2, except that on the basis of 100 weight part of polymer, 0.5 weight parts of sodium dioctyl-sulfosuccinate emulsifier was added to polymer latex emulsion. And, particle size distribution and physical properties of the obtained polymer latex resin powder are shown in Table 1.

Comparative Example 4

Polymer latex resin powder was obtained by the same process as in Example 2, except that no sodium dioctylsulfosuccinate emulsifier was added to polymer latex emulsion. And, particle size distribution and physical properties of the obtained polymer latex resin powder are shown in Table 1.

Particle size distribution and physical properties of the polymer latex resin powder obtained in Examples 1, 2 and Comparative Examples 1 to 4 are shown in Table 1.

TABLE 1

|  |  | Example | | Comparative Example | | | |
|---|---|---|---|---|---|---|---|
|  |  | 1 | 2 | 1 | 2 | 3 | 4 |
| Polymer latex |  | A | B | A | A | B | B |
| Emulsifier contents (weight parts) |  | 0.3 | 0.3 | 0.5 | — | 0.5 | — |
| Particle size distribution (wt %) | 400 μm or more | 1 | 3 | 0 | 2 | 3 | 2 |
|  | 300~400 μm | 11 | 9 | 7 | 15 | 11 | 15 |
|  | 70~300 μm | 85 | 88 | 78 | 80 | 71 | 81 |
|  | Less than 70 μm | 3 | 0 | 15 | 3 | 15 | 2 |
| Bulk Density (gr/cc) |  | 0.45 | 0.43 | 0.5 | 0.41 | 0.47 | 0.39 |

As shown in Table 1, since polymer latex resin powder prepared by the process of Examples 1 and 2 have 85 wt % or more of particles with diameter of 70 to 400 μm, particle size distribution is very uniform, dehydration and drying performances are improved and transfer of powder and packaging process are easy. And, since it has less than 5 wt % of particles having diameter of 70 μm or less, scattering of fine powders decreases in work site directly treating powder such as extrusion, etc., and influences on surrounding involved in treatment of powder is improved.

Meanwhile, in Comparative Examples 1 to 4, if emulsifier is introduced too much in latex emulsion, the bulk density increases but the size of particles generally decreases in coagulation due to over-stabilization. And, if no emulsifier is added, particles size distribution is generally fair but bulk density decreases.

Examples 3~4

On the basis of 100 weight parts of polymer, 0.3 weight parts of sodium lauryl sulfate emulsifier was added to polymer latex emulsion with solid contents of 40%, the polymer latex (A) was supplied to the lower part of a primary coagulation tank at a flow rate of 127 L/hr simultaneously with 9.7 L/hr (1.9 weight parts on the basis of polymer resin) of calcium salt diluted to 10% and 203 L/hr of water, and residence time in the primary coagulation tank and process temperature were respectively controlled to 3 minutes and 37° C. to induce coagulation, and then the coagulated polymer latex was transferred to secondary coagulation tank by overflow method. 15.3 L/hr of secondary calcium salt coagulant was added in the secondary coagulation tank, and residence time was controlled to 12 minutes and the amount of steam was controlled so that process temperature may be 42° C. Then, the coagulated slurry was transferred to the upper part of an aging tank, and it was made to stay in primary/secondary tanks respectively at 60° C./90° C. for each 35 minutes to sufficiently age it. The aged polymer latex resin powder was transferred to a storage tank. Particle size distribution and physical properties of the polymer latex resin powder obtained by the above process are shown in Table 2.

Example 4

On the basis of 100 weight parts of polymer, 0.3 weight parts of sodium lauryl sulfate emulsifier was add to polymer latex emulsion with solid contents of 40%, the polymer latex (A) was supplied to the lower part of a primary coagulation tank at a flow rate of 184 L/hr simultaneously with 11.8 L/hr (1.6 weight parts on the basis of polymer resin) of calcium salt coagulant diluted to 10% and 213 L/hr of water, and residence time in the primary coagulation tank and process temperature were respectively controlled to 2 minutes 30 seconds and 37° C. to induce coagulation, and then the coagulated polymer latex was transferred to a secondary coagulation tank by overflow method. 22.0 L/hr of secondary calcium salt coagulant was added in the secondary coagulation tank, residence time was controlled to 10 minutes and the amount of steam was controlled so that process temperature may be 42° C. The coagulated slurry was transferred to the upper part of an aging tank, and it was made to stay in primary/secondary aging tanks respectively at 60° C./90° C. for each 30 minutes to sufficiently age it. The aged polymer latex resin powder was transferred to a storage tank. Particle size distribution and physical properties of latex resin powder obtained by the above process are shown in Table 2.

Comparative Example 5

Polymer latex powder was obtained by the same process as in Example 3, except that the contents of primary coagulant was set to 11.2 L/hr (2.2 weight parts on the basis of polymer resin). Particle size distribution and physical properties of latex resin powder obtained by the above process are shown in Table 2.

Comparative Example 6

Polymer latex powder was obtained by the same process as in Example 4, except that the contents of primary coagulant was set to 16.2 L/hr (2.2 weight parts on the basis of polymer resin). Particle size distribution and physical properties of latex resin powder obtained by the above process are shown in Table 2.

TABLE 2

|  |  | Example | | | Comparative Example | |
| --- | --- | --- | --- | --- | --- | --- |
|  |  | 1 | 3 | 4 | 5 | 6 |
| Polymer latex |  | A | A | A | A | A |
| Total solid contents |  | 13% | 15% | 18% | 15% | 18% |
| Coagulant contents (weight parts) |  | 2.2 | 1.9 | 1.6 | 2.2 | 2.2 |
| Flow rate of primary coagulant (L/hr) |  | 11.7 | 9.7 | 11.8 | 11.2 | 16.2 |
| Residence time in primary coagulation tank (min.) |  | 2.5 | 3.0 | 2.5 | 3.0 | 2.5 |
| Particle size distribution (wt %) | 400 μm or more | 1 | 3 | 5 | 8 | Operation impossible |
|  | 300~400 μm | 11 | 13 | 14 | 27 | — |
|  | 70~300 μm | 85 | 80 | 74 | 52 | — |
|  | Less than 70 μm | 3 | 4 | 7 | 13 | — |
| Bulk Density (gr/cc) |  | 0.45 | 0.47 | 0.51 | 0.41 | — |
| Operation property |  | good | good | good | normal | bad |

As shown in Table 2, in Examples 1, 3 and 4, as total solid contents increase, contents of coagulant determining critical coagulation concentration decrease, and, although there is no significant difference in operation property, particle size distribution broadens as solid contents increase.

Meanwhile, in Comparative Examples 5 and 6, when total solid contents increase with coagulant contents of 2.2 weight parts equally in Example 1, particle size distribution was very irregular and operation was impossible at solid contents of 18% due to rapid increase in viscosity in coagulation tank.

In addition, the polymer latex resin powder produced according to the present invention has 85 wt % or more of particles having diameter of 70~400 μm and each 10 wt % or less of fine powder with diameter of 70 μm or less and coarse powder with diameter of 400 μm or more, and it has superior bulk density and caking property.

The invention claimed is:

1. A process for preparing polymer latex resin powder comprising:
   introducing an emulsifier into a storage tank containing a polymer latex emulsion to form a polymer latex;
   continuously supplying the polymer latex, primary coagulant and water to a primary coagulation tank to prepare a mixture, wherein the primary coagulant is diluted to concentration of 5 to 10 wt % with water and introduced in an amount of 0.5 to 2.5 weight parts per 100 weight parts of polymer;
   primary coagulating the mixture in the primary coagulation tank by allowing the mixture to remain for 2 to 5 minutes to prepare a primary coagulated slurry wherein a temperature of the primary coagulation tank is 30 to 40° C. lower than or equal to the glass transition temperature of the polymer latex and transferring the prepared primary coagulated slurry to a secondary coagulation tank;
   secondary coagulating in the primary coagulated slurry in the secondary coagulation tank by allowing the primary coagulated slurry to remain for 10 to 25 minutes to prepare a secondary coagulated slurry wherein a temperature of the secondary coagulation tank is 1 to 10° C. greater than or equal to the temperature of the primary coagulation tank, and transferring the prepared secondary coagulated slurry to a primary aging tank, wherein the secondary coagulant is introduced in an amount of 2 to 3 weight parts per 100 weight parts of polymer;
   primary aging the secondary coagulated slurry in the primary aging tank by allowing the secondary coagulated slurry to remain for 60 to 90 minutes to prepare a primary aged slurry, wherein a temperature of the primary aging tank is 5 to 20° C. greater than or equal to the temperature of the secondary coagulation tank, and transferring the prepared primary aged slurry to a secondary aging tank; and
   secondary aging the primary aged slurry in the secondary aging tank by allowing the primary aged slurry to remain for 60 to 90 minutes, wherein a temperature of the secondary aging tank is 10 to 20° C. greater than or equal to the temperature of the primary aging tank.

2. The process for preparing polymer latex resin powder according to claim 1, wherein the emulsifier is introduced in an amount of 0.3 to 0.5 weight parts per 100 weight parts of polymer.

3. The process for preparing polymer latex resin powder according to claim 1, wherein the emulsifier is sodium lauryl sulfate or sodium dioctylsulfosuccinate.

4. The process for preparing polymer latex resin powder according to claim 1, wherein each of the primary coagulating agent and the secondary coagulating agent is selected from a group consisting of hydrochloric acid, sulfuric acid, phosphoric acid, calcium salt and a mixture thereof.

5. The process for preparing polymer latex resin powder according to claim 1, wherein a particle size distribution of the polymer latex is 0.05 to 0.4 μm.

6. The process for preparing polymer latex resin powder according to claim 1, wherein the polymer latex resin powder has 85 wt % or more of particles size of 70 to 400 μm.

* * * * *